United States Patent [19]

Mattes et al.

[11] Patent Number: 5,216,284
[45] Date of Patent: Jun. 1, 1993

[54] PASSENGER SAFETY DEVICE FOR VEHICLES

[75] Inventors: Bernhard Mattes, Sachsenheim; Hartmut Schumacher, Freiberg am Neckar; Peter Taufer, Renningen, all of Fed. Rep. of Germany

[73] Assignee: Robert Bosch GmbH, Stuttgart, Fed. Rep. of Germany

[21] Appl. No.: 777,511
[22] PCT Filed: May 12, 1990
[86] PCT No.: PCT/DE90/00342
§ 371 Date: Nov. 25, 1991
§ 102(e) Date: Nov. 25, 1991
[87] PCT Pub. No.: WO91/00636
PCT Pub. Date: Jan. 10, 1991

[30] Foreign Application Priority Data

Jun. 24, 1989 [DE] Fed. Rep. of Germany ....... 3920713

[51] Int. Cl.⁵ ..................... B60K 28/14; B60R 21/32
[52] U.S. Cl. .................. 307/10.1; 180/282; 280/735; 340/436
[58] Field of Search ............. 307/9, 1, 10.1; 340/669, 436, 438, 440; 280/728, 734, 735; 180/271, 274, 282; 73/510, 514, 518, 649, 652, 1 D, 1 DV; 324/727, 527

[56] References Cited

U.S. PATENT DOCUMENTS

| | | | |
|---|---|---|---|
| 4,359,715 | 11/1982 | Langer et al. | 340/52 |
| 4,381,457 | 4/1983 | Wiles | 307/64 |
| 4,384,734 | 5/1983 | Yasui | 280/735 |
| 4,835,513 | 5/1989 | McCurdy et al. | 340/438 |
| 5,023,468 | 6/1991 | Drobny et al. | 307/10.1 |
| 5,045,835 | 9/1991 | Masegi et al. | 307/10.1 |
| 5,058,920 | 10/1991 | Burger et al. | 307/10.1 |
| 5,158,323 | 10/1992 | Yamamoto et al. | 280/734 |

Primary Examiner—A. D. Pellinen
Assistant Examiner—Richard Elms
Attorney, Agent, or Firm—Kenyon & Kenyon

[57] ABSTRACT

A passenger safety device includes at least one electrical component, especially a restraint system such as an airbag and/or seat belt tightener, for a vehicle equipped with an electrical system, with an energy reserve circuit to temporarily maintain the voltage supply for triggering of the safety device. In order to ensure reliable functioning, it is proposed that the safety device be disconnected from the electrical system voltage ($U_N$) when the voltage exceeds a maximum value ($U_{max}$) which can be predetermined, and then be connected with the energy reserve circuit (9).

12 Claims, 1 Drawing Sheet

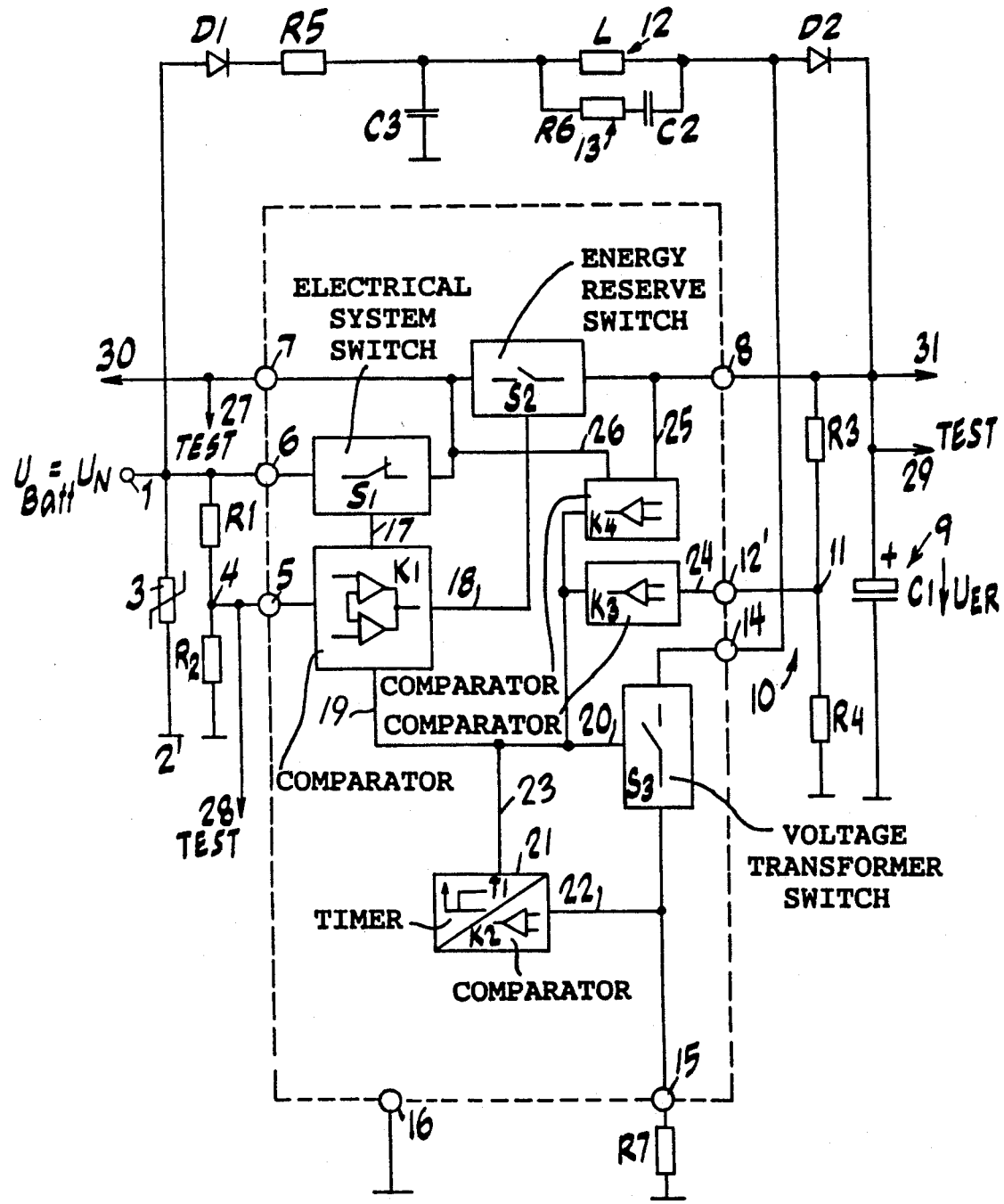

PASSENGER SAFETY DEVICE FOR VEHICLES

FIELD OF THE INVENTION

The present invention relates to a passenger safety device comprising at least one electrical component, especially a restraint system such as an airbag or seat belt tightener, for a vehicle equipped with an electrical system.

BACKGROUND OF THE INVENTION

Safety devices for motor vehicles, such as the airbag system, have components which are operated electrically. For reliable operation of these safety devices, a failure of the electrical components due to voltage variations in the electrical system of the vehicle must be avoided.

It is known to counter an overly great decrease in the voltage of the electrical system with a voltage transformer which forms a correspondingly greater supply voltage for the operation of the safety device from the low electrical system voltage still present. Furthermore, so-called energy reserves are used, which maintain the ability of the safety device to function for a short period of time, after failure of the voltage supply.

U.S. Pat. No. 4,384,734 describes a passenger safety device for a vehicle equipped with an electrical system. This has at least one electrical component and one energy reserve circuit for temporarily maintaining the voltage supply for triggering a safety device. If an excess voltage protection device is provided in this known device, as is usual, but not mentioned in the document, and if a maximum value of the electrical system voltage which can be predetermined is exceeded, the automatic result is that the safety device is disconnected from the electrical system voltage and connected with the energy reserve voltage.

Finally, a device for avoiding data loss in a temporary memory in the case of failure of an alternating current network is known from U.S. Pat. No. 4,381,457. This device comprises a monitoring device having a window comparator, which connects the device to an auxiliary alternating voltage source.

From U.S. Pat. No. 4,835,513, a voltage supply supported by capacitors is also known, which further has a comparator with a test connection for function testing.

An object of the invention deals with the problem of always keeping the electrical energy which is sufficient to operate or trigger the safety device available even in atypical operating conditions.

ADVANTAGES OF THE INVENTION

The passenger safety device according to the present invention has the advantage that when excess voltages occur in the electrical system supply, reliable functioning of the passenger safety device, especially of its triggering device, is nevertheless ensured. In general, it is assumed that if the battery of the vehicle is disconnected (e.g. during the accident phase, due to deformations), an immediate collapse of the electrical system voltage will result, which means that a low voltage condition will occur. However, this is not always the case. It can also happen that as a result of the load loss of the generator, as described, the rotor of which continues to turn unchanged at the start of the impact, excess excitation occurs, resulting in an excess voltage in the electrical system of the vehicle. A loss in the generator load can occur not only due to a disconnection of the battery, but also due to disconnection of the radiator fan motor or the headlights or another power consumption device that is turned on. Therefore, the opposite effect on the electrical system, namely the occurrence of short-term excess voltage, is more possible than has generally been assumed until now, since until now an immediate voltage reduction to zero has always been assumed. Power consumption devices connected to the electrical system, such as voltage regulators, end stage circuits, etc., are designed in such a way that they shut off above a certain excess voltage, e.g. greater than 22 volts. This has the disastrous effect, for the passenger safety devices stated initially, that the entire arrangement would fail to function. Therefore, if, for example, the voltage regulator in the restraint system (airbag) shuts off as the result of a transient excess voltage in the electrical system caused by an accident, the desired protective effect cannot be produced, or not within the necessary time. The entire safety system could become useless as a result. But since it is now provided, according to the present invention, that the safety device be disconnected from the electrical system if a predetermined maximum value of the electrical system voltage is exceeded, and be connected with the energy reserve circuit, proper functioning of the passenger safety device under the conditions assumed is always guaranteed, as long as the energy reserve circuit can take over the power supply to the electrical components. The "survival time" of the energy reserve circuit is easily in the range of at least 500 ms, on the basis of the means which can currently be used (e.g. capacitors). An accident occurs mostly within a time span of 100 ms, so that this represents a quintuple safety margin.

The safety device is also disconnected from the electrical system voltage when the voltage goes below a certain minimum value, and is then connected with the energy reserve circuit. Thus, the method of operation stated above is applied not only when the electrical system voltage is overly high, but also when it goes below a minimum value.

A comparator is provided to monitor the level of the electrical system voltage. The comparator controls an electrical system switch, which disconnects the electrical system voltage from the safety device. Furthermore, the comparator activates an energy reserve switch, with which the safety device is coupled to the energy reserve circuit.

In order to keep a sufficiently great supply voltage for the passenger safety device available even if the electrical system voltage drops, the energy reserve circuit has a voltage transformer to maintain a minimum potential.

According to a further development of the invention, the comparator is structured as a window comparator, i.e. it monitors a certain voltage range and thus an upper limit and a lower limit of the electrical system voltage, with the measures according to the present invention being carried out if the upper or lower limit is exceeded.

Finally, it is advantageous if the comparator has test inputs for function testing of the energy reserve circuit. Thus, the active shut-off of the electrical system supply can be periodically checked. This can be done with computer diagnostics, for example. Thus, an error detection possibility exists, so that reliable triggering of the passenger safety device is guaranteed. With known solutions, corresponding components, such as a varistor with a corresponding dropping resistor and a Zener diode, are placed ahead of the voltage regulator to limit excess voltages. In this connection, the limiting voltage of the Zener diode lies below the shut-off voltage of the connected electrical components. These limiting components have the disadvantage, however, in contrast to the device and method of the present invention, that they can no longer be checked in subsequent operation. Thus, it is not possible to predict whether the proper functioning of these components, and therefore of the passenger safety device, is guaranteed over the entire lifespan of vehicle. The diagnostic possibility of the device and method of the present invention provides a remedy here.

BRIEF DESCRIPTION OF THE DRAWING

The FIGURE shows a block diagram of an electrical component of a passenger safety device according to the principles of the present invention.

Referring to the FIGURE, the positive pole of a battery of a motor vehicle is applied to a terminal 1, while the negative pole of the battery is connected to ground 2. A voltage limiting component 3 (varistor) is placed in the circuit between the terminal 1 and ground 2. A voltage divider formed by the resistors $R_1$ and $R_2$ lies parallel to the voltage limiting component 3, with its tap 4 leading to a terminal 5. The terminal 1 is furthermore connected with a terminal 6.

An electrical system switch $S_1$ is connected with the terminal 6 with its one pole. The other pole leads to a terminal 7. The one pole of an energy reserve switch $S_2$ is furthermore connected with this terminal; its other pole leads to a terminal 8. A capacitor $C_1$ of an energy reserve circuit 9 lies between the terminal 8 and ground 2. A voltage divider 10 formed by the resistors $R_3$ and $R_4$ lies parallel to the capacitor $C_1$. A tap 11 of the voltage divider 10 leads to a terminal 12'.

Via a diode $D_1$ switched through in the conducting direction, the terminal 1 is connected with one connector of a resistor $R_5$, the other connector of which leads to a parallel circuit 12. The parallel circuit 12 is formed by an inductor L and an R/C element 13. The R/C element 13 is composed of a resistor $R_6$ in series with a capacitor $C_2$. The one connector of a capacitor $C_3$ is placed in the circuit between the resistor $R_5$ and the inductor L; its other connector is connected to ground 2. The parallel circuit 12 is followed by a diode $D_2$ in the conducting direction. The cathode of the diode $D_2$ is connected with the terminal 8, and the anode leads to a terminal 14.

The terminal 14 is furthermore connected with the one pole of a voltage transformer switch $S_3$, the other pole of which leads to a terminal 15, which is connected to ground 2 via a resistor $R_7$. Furthermore, a terminal 16 is provided, which is also connected to ground 2. The terminal 5 is connected with a comparator $K_1$, which is structured as a window comparator. The comparator $K_1$ has the outputs 17, 18 and 19. The output 17 leads to the electrical system switch $S_1$, the output 18 leads to the energy reserve switch $S_2$, and the output 19 is connected with the input 20 of the voltage transformer switch $S_3$. The switches $S_1$, $S_2$ and $S_3$ can be controlled via the outputs 17, 18 and 19.

Furthermore, a switching arrangement 21 is provided, which has a comparator $K_2$ and a timer element $T_1$. The input 22 of the switching arrangement 21 is connected with the terminal 15, while the output 23 of the switching arrangement 21 is connected with the input 20 of the voltage transformer switch $S_3$. An input 24 of a further comparator $K_3$ is connected with the terminal 12', and the two inputs 25 and 26 of a last comparator $K_4$ are connected with the terminals 8 and 7, while the outputs of the comparators $K_3$ and $K_4$ are connected with the input 20 of the voltage transformer switch $S_3$. Furthermore, test connections 27, 28 and 29 are formed, where the test connection 27 is connected with the terminal 7, the test connection 28 is connected with the terminal 5, and the test connection 29 is connected with the terminal 6. Furthermore, an output 30 is connected with the terminal 7, which leads to a restraint system evaluation circuit, not shown. Another output 31 is connected with the terminal 8 and leads to restraint system end stages, not shown, of the passenger safety device of the vehicle. The restraint device of the passenger safety device is structured as an airbag, for example. The present invention is not limited to this form, however, but can also relate to a belt tightener or other restraint system, etc.

In total, the following method of operation results:

The comparator $K_1$ monitors the electrical system voltage $U_N$ of the motor vehicle. The electrical system voltage $U_N$ corresponds to the battery voltage $U_{batt}$. This voltage is applied to the terminal 1 and is reduced by the voltage divider formed by the resistors $R_1$ and $R_2$, in accordance with the resistance ratio, so that a partial voltage is applied at the tap 4, which is passed to the terminal 5 of the comparator $K_1$. The comparator $K_1$ checks the level of the electrical system voltage $U_N$ with regard to whether a predetermined maximum value $U_{max}$ is exceeded, or a predetermined minimum value $U_{min}$ is not reached. If the electrical system voltage $U_N$ goes above the maximum value $U_{max}$, or below the minimum value $U_{min}$, corresponding control signals are issued at the outputs 17, 18 and 19, and passed on to the electrical system switch $S_1$, the energy reserve switch $S_2$ and the voltage transformer switch $S_3$, respectively. This has the effect that the electrical system switch $S_1$ and the voltage transformer switch $S_3$ are shut off, in other words opened, while at the same time, the energy reserve switch $S_2$ is closed. As a result of the opening of the electrical system switch $S_1$, the electrical system voltage $U_N$ is disconnected from the switching arrangement shown, and a connection between the terminals 7 and 8 is produced by way of the energy reserve switch $S_2$. A current which flows from the terminal 1 via the diode $D_1$, the resistor $R_5$, the inductor L, the voltage transformer switch $S_3$ and the resistor $R_7$ is diverted via the diode $D_2$ by opening the voltage transformer switch $S_3$, so that it flows into the capacitor $C_1$ of the energy reserve circuit 9. This has the result that corresponding charging of the capacitor $C_1$ takes place, with a simultaneous voltage increase. The energy stored in the capacitor $C_1$ is now available for the passenger safety device, especially for the triggering system. Via the output 31, the capacitor $C_1$ delivers its energy directly to the restraint system end stages located there, and via the energy reserve switch $S_2$, it delivers the energy to the output 30, with which the restraint system evaluation circuit is connected. If the restraint system evaluation circuit issues a command to trigger the passenger safety device, the restraint system end stages switch through and conduct the energy stored in the capacitor $C_1$ to an ignition cap of an airbag, for example.

From the above, it has already become clear that the voltage transformer switch $S_3$ leads to charging of the capacitor $C_1$ by means of its switching elements, when it is turned on and shut off. Preferably, the method of operation is such that the voltage dropping at the resistor $R_7$ is detected, and when a certain value is exceeded, the comparator $K_2$ is controlled, via the input 22, in such a way that the voltage transformer switch $S_3$ opens. When this happens, the voltage dropping at the resistor $R_7$ decreases to zero, which would result in immediate closing of the voltage transformer switch $S_3$. However, the latter event is prevented by the timer element $T_1$, so that the switch contact of the voltage transformer switch $S_3$ only returns to its closed position after an adjustable period of time. The process described repeats continuously, so that cycling occurs, more or less.

If the reserve energy voltage $U_{ER}$ applied to the energy reserve circuit 9 exceeds a value which can be predetermined, this is detected, via the voltage divider 10, by the comparator $K_3$, which applies a corresponding control signal to the input 20 of the voltage transformer switch $S_3$, which interrupts the cycle process described. In this way, further charging of the capacitor $C_1$ is stopped.

When the circuit is first put into operation, the energy reserve voltage $U_{ER}$ applied to the capacitor $C_1$ is equal to zero, while the battery voltage of the vehicle is applied to the terminal 7. This is detected by the comparator $K_4$, via its inputs 25 and 26. The comparator $K_4$ then controls the input 20 of the voltage transformer switch $S_3$ in such a way that it goes into its open condition. This causes the capacitor $C_1$ to be charged up particularly quickly, since no partial current flows away via the branch which contains the resistor $R_7$. Thus, the capacitor $C_1$ is also not charged by means of the cycle process described, since direct charging by the battery is possible more quickly. As soon as the energy reserve voltage $U_{ER}$ has reached a certain value, the cycle process of the voltage transformer switch $S_3$ is started.

The arrangement according to the invention allows a function diagnosis, in that corresponding control of the test connection 28 takes place, so that triggering of the switches $S_1$ to $S_3$ occurs. The process can be monitored for errors at the test connections 28 and 29; in particular, a drop in the energy reserve voltage $U_{ER}$ which occurs under stress can be observed and conclusions concerning the reliable functioning of the system can thus be drawn.

Since the electrical system voltage $U_N$ is not used to supply the restraint system end stages (because the energy reserve switch $S_2$ opens), an end stage overload or destruction in case of excess voltage in the electrical system, and simultaneous triggering of the passenger safety device, is prevented.

What is claimed is:

1. A safety system for controlling at least one restraint device in a vehicle which includes an electrical system, comprising:
   an electrical system switch for selectively coupling the restraint device to an output voltage of the electrical system;
   an energy reserve circuit for storing energy supplied by the electrical system;
   an energy reserve switch for selectively coupling the restraint device to the energy reserve circuit; and
   a comparator coupled to the electrical system switch and the energy reserve switch for determining whether the electrical system output voltage is above or equal to a predetermined minimum voltage and below or equal to a predetermined maximum voltage, and for controlling the electrical system switch and the energy reserve switch based thereon, such that if the electrical system output voltage is above or equal to the minimum voltage and below or equal to the maximum voltage, the restraint device is coupled to the electrical system output voltage, and if the electrical system output voltage is below the minimum voltage or above the maximum voltage, the restraint device is decoupled from the electrical system output voltage and is coupled to the energy reserve circuit.

2. The safety system as recited in claim 1, wherein the energy reserve circuit includes a capacitor.

3. The safety system as recited in claim 1, wherein the energy reserve circuit includes a voltage transformer for maintaining a reserve minimum voltage.

4. The safety system as recited in claim 1, wherein the comparator includes a window comparator.

5. The safety system as recited in claim 1, wherein the comparator includes a test connection for testing the energy reserve circuit.

6. The safety system as recited in claim 1, further comprising a voltage transformer switch coupled to the comparator, the comparator simultaneously controlling the electrical system switch, the energy reserve switch and the voltage transformer switch.

7. A method for controlling at least one restraint device in a vehicle which includes an electrical system, comprising the steps of:
   storing energy supplied by the electrical system in an energy reserve circuit;
   determining whether an output voltage of the electrical system is above or equal to a predetermined minimum voltage and below or equal to a predetermined maximum voltage; and
   coupling the restraint device to the electrical system output voltage if the electrical system output voltage is above or equal to the minimum voltage and below or equal to the maximum voltage, and decoupling the restraint device from the electrical system output voltage and coupling the restraint device to the energy reserve circuit if the electrical system output voltage is below the minimum voltage or above the maximum voltage.

8. The method as recited in claim 7, wherein the energy reserve circuit includes a capacitor.

9. The method as recited in claim 7, further comprising the step of maintaining a reserve minimum voltage in the energy reserve circuit.

10. The method as recited in claim 7, wherein the step of determining is performed through the use of a window comparator.

11. The method as recited in claim 7, further comprising the step of simultaneously controlling an electrical system switch, an energy reserve switch and a voltage transformer switch.

12. The method as recited in claim 7, wherein the restraint device is coupled to the electrical system output voltage, decoupled from the electrical system output voltage, and coupled to the energy reserve circuit through a plurality of switches.

* * * * *